United States Patent Office 2,989,847
Patented June 27, 1961

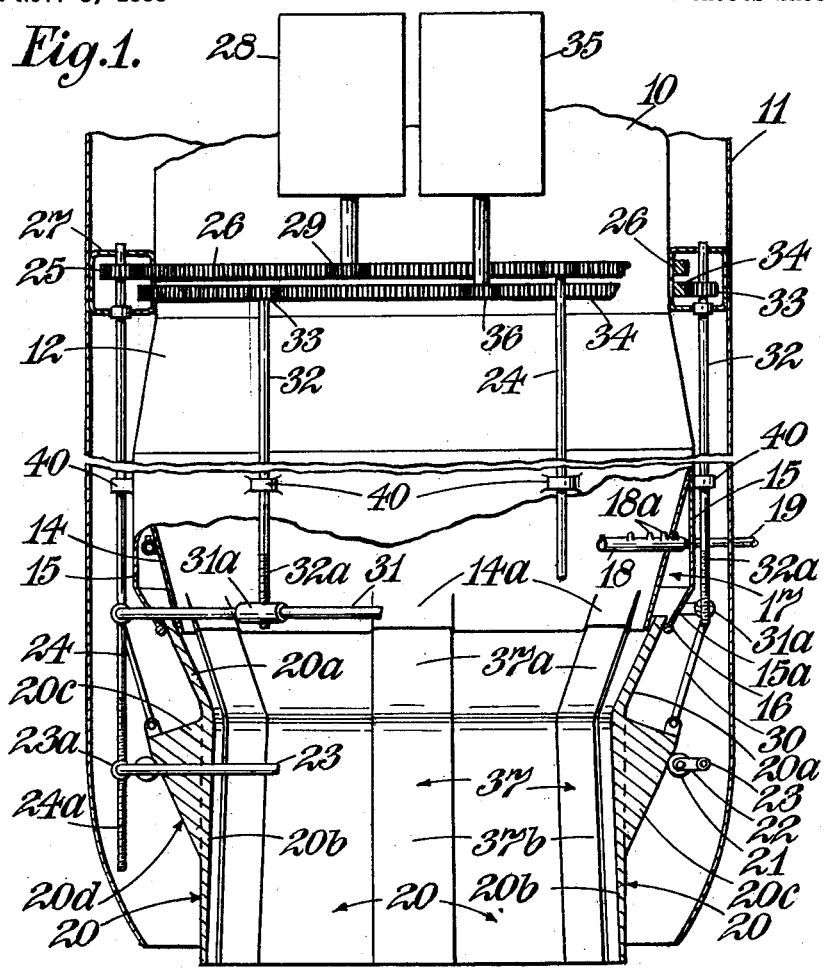

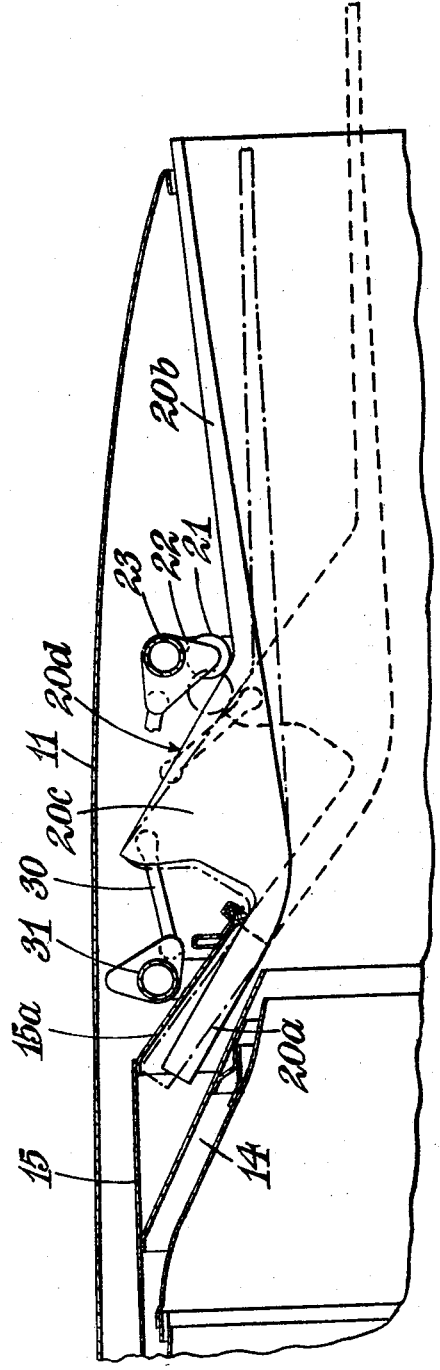

2,989,847
VARIABLE CONVERGENT/DIVERGENT JET PROPULSION NOZZLE
Rowan Herbert Colley, Sunny Hill, Derby, England, assignor to Rolls-Royce Limited, Derby, England, a British company
Filed Nov. 3, 1958, Ser. No. 771,626
Claims priority, application Great Britain Nov. 5, 1957
11 Claims. (Cl. 60—35.6)

This invention comprises improvement in or relating to jet propulsion nozzles and has for an object to provide an improved construction of convergent/divergent nozzle.

According to the present invention, a convergent/divergent nozzle comprises a series of rigid flap elements, each comprising an upstream portion and a downstream portion inclined at an obtuse angle to the upstream portion, the flap elements being arranged in an annular assembly with the upstream portions thereof forming the convergent nozzle section and the downstream portions forming the divergent nozzle section, and an annular wall which encircles the flap elements at their upstream ends and against which the flap elements bear radially in gas sealing contact, the flaps being movable relative to the wall, whilst maintaining said gas sealing contact, to vary the nozzle.

By using rigid flap elements comprising both convergent and divergent portions, a robust nozzle is provided in which difficulties arising in nozzles having separate flaps for the convergent and divergent sections are avoided and moreover a smoother nozzle throat is produced. Also by arranging that the flaps bear radially against an encircling wall gas sealing is improved.

According to a preferred feature of the present invention, the flap elements are arranged to bear on a sealing bead on the encircling wall and are free to pivot on the bead and also to be displaceable axially relative to the bead whilst maintaining gas sealing contact with the bead, whereby the nozzle may be varied either in effective area or in configuration, that is in convergence and divergence, or in both area and configuration.

In one preferred arrangement according to this feature of the invention, each flap element bears on the bead by its upstream portion and has on the external surface of its downstream portion a ramp inclined to the nozzle axis, the ramps being engaged by axially-displaceable rollers, and the flap elements are also connected by links to an axially-displaceable member, there being separate power means for moving the rollers and the axially displaceable member. By moving the rollers alone, or the member alone, or both the rollers and the member in a correlated manner, the configuration of the nozzle or its area or both may be adjusted in desired manner.

According to another feature of this invention, the nozzle may comprise a second annular wall internally of and spaced from the flap-encircling wall to define a chamber into which the upstream ends of the flap elements project, cooling air being fed into the chamber to assist in cooling the flap elements.

According to another feature of this invention, the nozzle may also comprise sealing flaps internally overlapping the adjacent edges of the flap elements, the sealing flaps being supported to maintain contact with the flap elements. For instance in a construction having a second wall as just set forth the sealing flaps may have their upstream ends slidably engaged in flutes in the second wall and may have retaining clips at their downstream ends engaging the adjacent edges of the flap elements.

Two embodiments of variable nozzle of this invention will now be described with reference to the accompanying drawings in which—

FIGURE 1 is a side elevation of the nozzle with parts broken away to show details of construction,
FIGURE 2 is a perspective view of parts of the nozzle, and
FIGURE 3 is an axial section showing three positions of adjustment of a slightly modified embodiment of nozzle according to the invention.

The nozzle is situated at the outlet of a jet-pipe 10 leading from a gas-turbine engine and is enclosed in a fairing 11 which also extends forwards in spaced relation to the jet-pipe 10.

The jet-pipe 10 has a divergent frusto-conical portion 12 which terminates at the upstream end of a cylindrical portion and the fixed structure of the nozzle is either integral or secured to the downstream end of the cylindrical portion.

The fixed structure of the nozzle comprises an inner convergent annular wall 14, the downstream edge of which is formed with axially-spaced shallow flutes 14a and an outer cylindrical wall 15 which terminates in an axially-short convergent frusto-conical portion 15a. The downstream edge of the portion 15a is formed with a bead 16, which may as shown in FIGURE 3 be formed by a strip 16a of braided wire, and the bead and the downstream edge of the inner wall 14 are substantially coplanar and spaced radially apart. The chamber 17 formed by the walls 14, 15, 15a contains an annular manifold 18 formed with nozzles 18a and cooling air is fed into the chamber 17 from the manifold, the latter being supplied through conduit 19.

The moving structure of the nozzle by which either the area or the configuration or both the area and the configuration of the nozzle can be varied, comprises a series of, say six part-annular flaps 20. Each flap 20 has an upstream portion 20a and a downstream portion 20b which make an obtuse angle with one another, and when the flap 20 is in position with the upstream edge of its upstream portion 20a inserted between the bead 16 and the downstream edge of the wall 14, the upstream portion 20a of the flap forms part of the convergent section of the nozzle and the downstream portion 20b forms part of the divergent section of the nozzle. Each flap 20 is held by gas pressure against the bead 16 and on adjustment either pivots or slides or both pivots and slides about the bead 16.

Each flap has integral with it an outwardly-extending rib 20c, the outer surface 20d of which affords a ramp inclined to the nozzle axis and converging towards the axis in the downstream direction. In the illustrated construction the ramps 20d are parallel to the outer surfaces of the upstream flap portions 20a.

The flaps 20 are adjustably supported as follows. Each ramp 20d is engaged by a roller 21 journalled in a bracket 22 secured on a ring 23 encircling the flaps 20, and the ring 23 has a series of internally threaded parts 23a engaged by threaded portions 24a of a series of shafts 24. The shafts 24 extend axially outside the nozzle and jet-pipe 10, and at their forward ends carry pinions 25 meshing with an annular gear 26 encircling the jet pipe 10 and accommodated within a housing 27. The annular gear 26 is driven by a motor 28 through a pinion 29. Rotation of the gear 26 causes rotation of the shafts 24 and axial movement of the ring 23 carrying the rollers 21 and pivotal movement of the flaps. The effect of adjusting the position of the rollers 21 is shown in FIGURE 3 in which one flap position is shown in full lines and a second flap position, obtained by displacing rollers 21, is shown in chain lines.

Each flap 20 also has associated with it a pair of links 30 which are pivoted at one end to the radially outer portion of the rib 20c and at the other end to a ring 31 which encircles the nozzle. The ring 31 has a number of internally-threaded portions 31a engaged by threaded portions 32a of a series of shafts 32 which extend axially outside the nozzle and jet-pipe and which carry at their forward ends pinions 33 meshing with an annular gear 34. The gear 34 is accommodated in the housing 27 and is driven by a motor 35 through a pinion 36. Rotation of the gear 34 causes rotation of the shafts and axial displacement of the ring 31 and of flaps 20. The effect of displacing the flaps axially is seen in FIGURE 3 by comparing the chain line position and dotted position of the flap element.

The rods 24, 32 may be supported between their ends in brackets 40 on the outside of wall 15.

The circumferential edges of the flaps 20 are spaced apart and the gaps between them are covered by sealing flaps 37 having upstream and downstream portions 37a, 37b corresponding to and overlapping the edges of the portions 20a, 20b. The upstream ends of the sealing flaps 37 are slidingly received in the flutes 14a and the sealing flaps 37 are retained in position at their downstream ends by retainer clips 38.

In use, the effective area of the nozzle or its configuration or both are varied by suitably adjusting the axial positions of the rings 23, 31.

Thus by moving the ring 31 forwardly (i.e. upwardly in FIGURE 1 and to the left as viewed in FIGURE 3 of the drawing) the flaps 20 move bodily forwardly and outwards so increasing the effective area of the nozzle without varying the inclination of the portions 20a, 20b to the nozzle axis. This is due to the ramps 20d being parallel to the outer surface of the portions 20a.

Alternatively the ramps can be slightly curved, and/or varied slightly from being parallel to the portions 20a (which themselves could be slightly curved) so that when the throat is varied the inclinations can be caused to vary in a predetermined manner rather than remaining constant. This may be desired so that as the throat is varied the inclination will alter to give substantially constant area ratio between throat and exit.

By moving the ring 23 alone, the flaps 20 are caused to pivot about the bead 16 or 16a so both varying the effective area of the nozzle and also the inclination of the portions 20a, 20b to the nozzle axis.

By moving rings 23, 31 in a correlated manner any change in effective area due to movement of the ring 23 can be compensated by an opposite change due to movement of ring 31, and thus a change of configuration of the nozzle may be obtained without a change in effective area.

The arrangement of this invention has a number of advantages. For instance since the divergent nozzle portions are integral with the convergent portions, hinging and sealing difficulties due to the provision of separate flaps for these portions are avoided, and moreover a more rigid construction is obtained. Also since no hinges are provided between the convergent and divergent portions a smoother nozzle throat is produced.

By pivotally supporting the upstream ends of the flaps 20 against the external bead 16, the advantage is obtained that effective sealing against the egress of hot gas is obtained at the pivotal points of the flaps 20 in all positions thereof. Also by providing the chamber 17 and supplying air thereto, the upstream ends of the flaps are kept cool which is especially desirable at large effective nozzle areas which are employed when fuel is being burnt in the jet pipe for reheat purposes.

I claim:

1. A convergent/divergent jet propulsion nozzle comprising a series of rigid part-annular flap elements, said flap elements extending longitudinally of the nozzle, each flap element having an upstream portion and a downstream portion inclined at an obtuse angle to the upstream portion, said flap elements being disposed in a ring with the upstream portions thereof together forming a convergent annular section of the nozzle and the downstream portions together forming a divergent annular section of the nozzle, a fixed annular wall having an annular part encircling the upstream portions of the flap elements and forming a radially-inwardly facing annular fulcrum for pivoting of the flap elements, said flap elements being freely urged outwardly by gas pressure in the nozzle to cause the radially-outwardly facing surfaces of the upstream portions of the flap elements to bear with sliding and pivotal freedom in gas-sealing contact with said annular part, and means connected to the flap elements to cause sliding of the flap elements on the annular part and to cause pivoting of the flap elements about the annular part which supports the flap elements during such sliding and pivoting against radial outward displacement under the action of gas pressure within the nozzle.

2. A convergent/divergent jet propulsion nozzle according to claim 1, wherein said annular part is a sealing bead and the flap elements are urged by gas pressure in the nozzle into gas-sealed sliding and pivotal contact with the sealing bead.

3. A convergent/divergent jet propulsion nozzle according to claim 1, said means connected to the flap elements comprising first power means co-operating with the flap elements and adapted to effect pivotal movement of the flap elements, and second power means co-operating with the flap elements and operable independently of the first power means to effect axial displacement of the flap elements, selective operation of the first power means and second power means permitting selective adjustment of the nozzle area alone, the nozzle configuration alone, and the nozzle area and nozzle configuration simultaneously.

4. A convergent/divergent jet propulsion nozzle comprising a series of rigid part-annular flap elements, said flap elements extending longitudinally of the nozzle, each flap element having an upstream portion and a downstream portion inclined at an obtuse angle to the upstream portion, said flap elements being disposed in a ring with the upstream portions thereof together forming a convergent annular section of the nozzle and the downstream portions together forming a divergent annular section of the nozzle, a fixed annular wall encircling the upstream portions of the flap elements, the flap elements being freely urged outwardly by gas pressure in the nozzle with their upstream portions in sliding and pivotal contact with said annular part which supports the upstream portions of the flap elements during such sliding and pivoting against radially outward displacement under the action of gas pressure within the nozzle, each said flap element having on the external surface of its downstream portion a ramp inclined to the nozzle axis, first power means, rollers engaging the ramps of the flap elements, the rollers being connected together and to the first power means to be displaceable axially of the nozzle, an axially-displaceable member, second power means connected to move the axially-displaceable member axially of the nozzle, and links connecting the axially-displaceable member and the flap elements to move the flap elements in sliding contact with the annular part.

5. A convergent/divergent jet propulsion nozzle according to claim 4, comprising a ring encircling the flap elements, the rollers co-operating with the ramps being mounted on the ring and the ring is displaceable axially of the nozzle by the first power means.

6. A convergent/divergent jet propulsion nozzle according to claim 5, where first power means associated with the rollers comprises a motor driving a pinion, an annular gear meshing with the pinion, a series of angularly-spaced axially-extending shafts externally of the nozzle, pinions carried on the shafts and meshing with the annular gear, and threaded connections between the shafts and the roller-carrying ring, whereby on operation of the motor the ring is displaced axially of the nozzle.

7. A convergent-divergent jet propulsion nozzle according to claim 4, wherein the axially-displaceable member to which the flap elements are linked, comprises a ring encircling the flap elements, and the second power means comprises a second motor driving a further pinion, a second annular gear meshing with the further pinion, a second series of angularly-spaced axially-extending shafts externally of the nozzle, pinions on the second series of shafts meshing with the second annular gear, and threaded connections between the second series of shafts and the axially-displaceable member.

8. A convergent-divergent jet propulsion nozzle according to claim 4, wherein the surfaces of the ramps with which the rollers co-operate, are substantially parallel to the surfaces of the upstream portions which bear on the annular part.

9. A convergent-divergent jet propulsion nozzle according to claim 4 wherein the configuration of the surfaces of the flap elements contacting with the annular part, the configuration of the surfaces of the ramps with which the rollers co-operate and the disposition of these surfaces relative to the flap elements are arranged so that as the throat is varied a substantially constant area ratio may be maintained between the throat and exit.

10. A convergent/divergent jet propulsion nozzle according to claim 1 comprising also a second annular wall internally of and spaced from the flap-encircling wall to define a chamber into which the upstream ends of the flap elements project, and means feeding cooling air into the chamber to assist in cooling the flap elements.

11. A convergent/divergent jet propulsion nozzle according to claim 1 comprising also sealing flaps internally overlapping the adjacent edges of the flap elements, the sealing flaps being maintained in contact with the flap elements.

References Cited in the file of this patent

UNITED STATES PATENTS

| | | |
|---|---|---|
| 2,509,238 | Martin | May 30, 1950 |
| 2,778,190 | Bush | Jan. 22, 1957 |
| 2,780,056 | Colley | Feb. 5, 1957 |
| 2,831,319 | Geary | Apr. 22, 1958 |
| 2,831,321 | Laucher | Apr. 22, 1958 |

FOREIGN PATENTS

| | | |
|---|---|---|
| 1,138,935 | France | Feb. 4, 1957 |

(Corresponding British 788,359, Jan. 2, 1958)